April 16, 1968  J. R. ERWIN  3,378,229
RADIAL FLOW TURBINE
Filed July 16, 1965 2 Sheets-Sheet 1
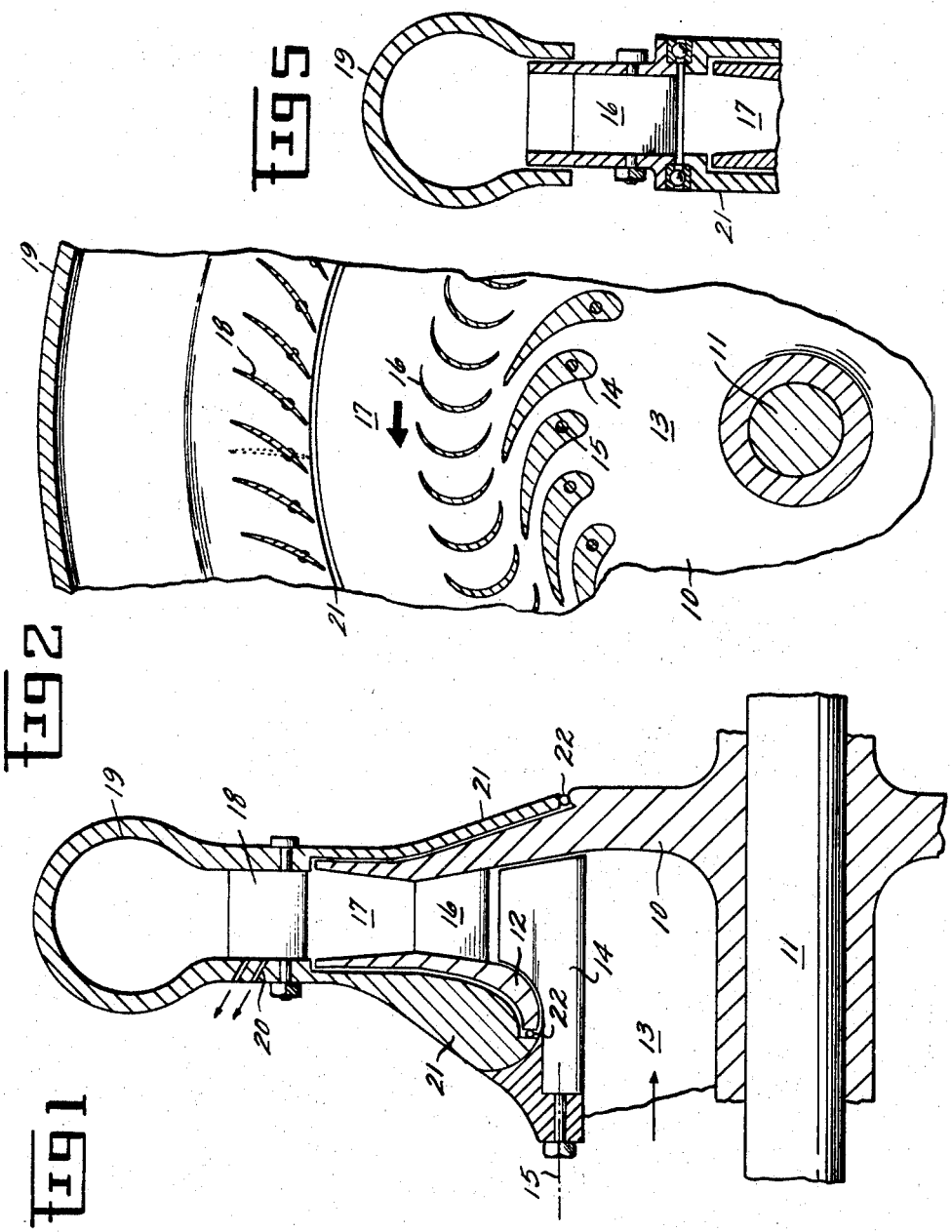
INVENTOR.
JOHN R. ERWIN
BY
ATTORNEY April 16, 1968
J. R. ERWIN
3,378,229
RADIAL FLOW TURBINE
Filed July 16, 1965
2 Sheets-Sheet 2
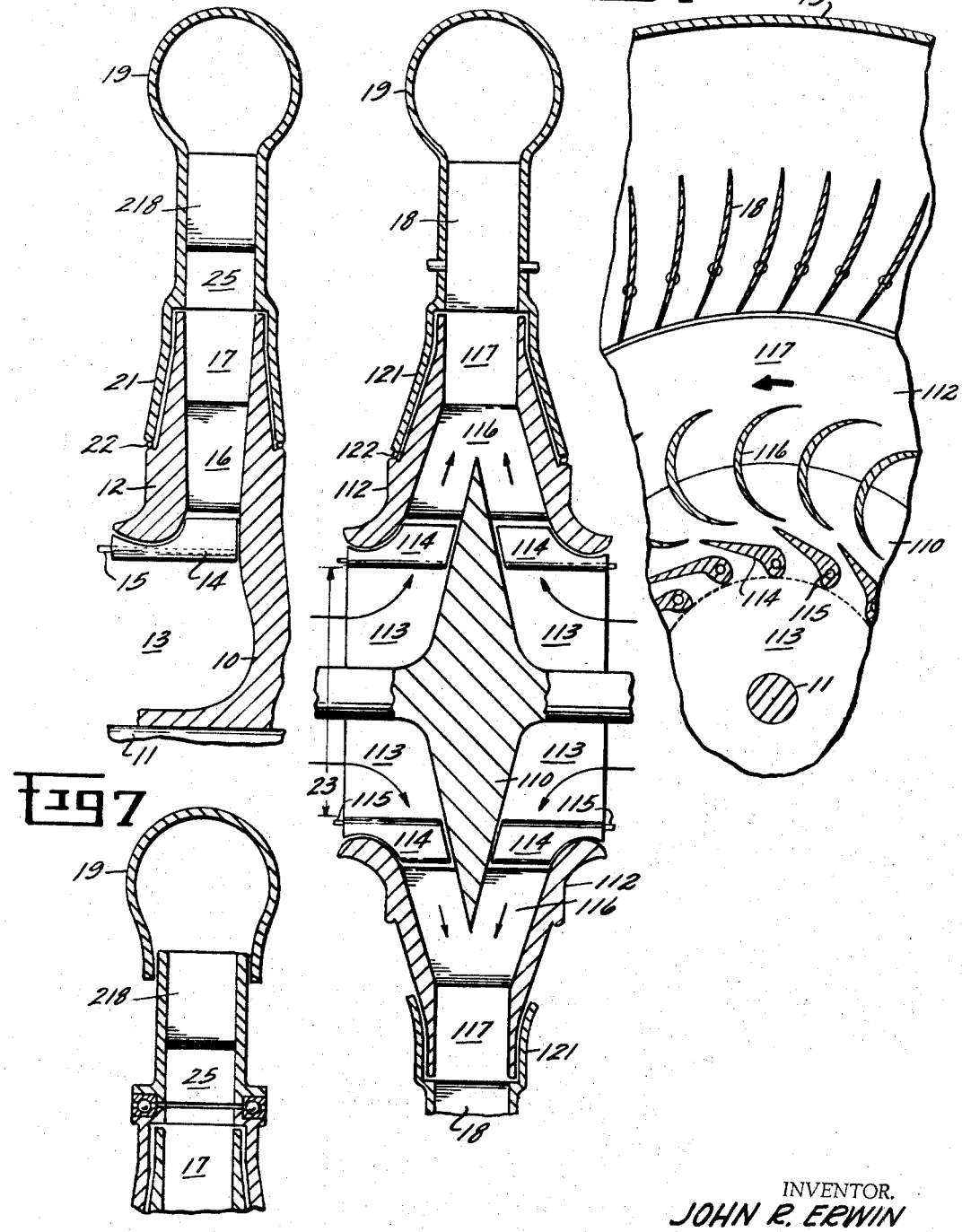
INVENTOR.
JOHN R. ERWIN
BY
ATTORNEY—

United States Patent Office 3,378,229
Patented Apr. 16, 1968

3,378,229
RADIAL FLOW TURBINE
John R. Erwin, Cincinnati, Ohio, assignor to General
Electric Company, a corporation of New York
Filed July 16, 1965, Ser. No. 472,486
14 Claims. (Cl. 253—74)

The present invention relates to a radial flow machine, and, more particularly, to a radial outflow turbine that produces high work output in a single stage.

One of the problems in small lightweight jet type engines is the inability to provide a satisfactory turbine that obtains sufficiently high work output and is still small and lightweight enough to be satisfactory for many applications. All multi-stage axial turbines, although capable of reasonable performance because of very light bucket loadings, are prohibitively expensive for many engine applications. This is true because of the many rows of high precision buckets of costly materials required to obtain the work needed. Additionally, axial flow single stage supersonic turbines as well as centrifugal turbines of conventional geometry (whether inflow or outflow) have failed to develop the level of efficiency required to make a high performance engine. Their performance limitations are related to the basic axial inlet aerodynamics which generate strong spanwise variations in fluid velocity and flow angle into each bucket row. These spanwise variations of fluid properties creating secondary flows not only restrict the attainable performance of the turbine but require complex twisted and tapered blade shapes that are expensive to manufacture. Additionally, the non-uniform flow leaving the buckets prevents efficient recovery of the kinetic energy of the discharging gas.

A large contribution to rotor losses in axial and centrifugal fluid machines such as turbines is believed to be due to relative vorticity. Turbines of the conventional radial inflow impeller type, which receive the gas in a radial direction and direct it axially outward operate with a secondary flow superimposed on the free stream through flow relative velocity. Although the inlet absolute vorticity may be zero, the relative vorticity sets up a circulatory flow in a plane normal to the throughflow velocity within the confines of the rotating passage. This results in a secondary velocity which analysis has shown is of the same order of magnitude as the throughflow velocity and contributes significantly to rotor, diffuser and stator losses.

The main object of the present invention is to provide a radial outflow fluid machine as applied to a turbine which is so constructed as to substantially eliminate secondary velocity and thus prevent any effect on the main free stream throughflow velocity.

Another object is to provide such a turbine in which the construction and location of the turbine buckets is such that the flow is substantially two-dimensional throughout the complete turbine and the rotational speed of any spanwise element of a rotor bucket is substantially constant.

A further object is to provide such a turbine in which the gas is handled only in a radial outflowing direction and boundary layers are centrifuged outward in the turbine.

Another object is to provide such a turbine which utilizes a rotating diffuser in combination with turbine buckets accepting only radially directed gas either subsonically or supersonically, to provide a very high work output single stage machine.

A further object is to provise such a turbine in which the sealing problems are reduced to a minimum and the sealing structure is maintained on a small diameter of the rotor.

Another object is to provide a turbine in which two-dimensional radial only flow is provided to ensure maximum recovery of the kinetic energy in the discharged gases.

Briefly stated, the invention provided a radial outflow turbine that may be a single or dual entry turbine and which has a rotor disc mounted on a shaft for rotation. A second disc concentric with and axially spaced from the rotor disc is provided. Arranged serially outward then there are provided cambered turbine buckets preferably of constant untwisted cross-section which join the discs together to provide a single rotatable unit with an unobstructed curved inlet gas passage to direct gas radially outward through nozzles and between the discs which rotate in one direction only. The location of the turbine buckets at a sufficient radial distance from the center of rotation and the unobstructed inlet ensure that only radial or two-dimensional gasflow reaches the turbine buckets. The discs extend radially beyond the turbine buckets to form a rotating vaneless diffuser passage which is followed by a vaned stationary diffuser. A scroll collecting means is radially spaced from the diffuser passage to collect the gas from the vaned diffuser for distribution. Modification permits a vaneless diffuser chamber or passage between the end of the rotating diffuser and the vaned diffuser as well as a freely rotatable separate diffuser beyond the rotor. Further, modification permits boundary layer bleed to be used when necessary.

While the specification concludes with claims particularly pointing out and distinctly claiming the subject matter which is regarded as the invention, it is believed the invention will be better understood from the following description taken in connection with the accompanying drawings in which:

FIGURE 1 is a partial cross-sectional view of a typical single inlet turbine of the instant invention;

FIGURE 2 is a partial cross-sectional view showing the nozzle, bucket and vane layout of FIGURE 1;

FIGURE 3 is a view similar to FIGURE 1 showing a dual entry turbine;

FIGURE 4 is a partial cross-sectional view showing the nozzle, bucket and vane layout of FIGURE 3;

FIGURE 5 is a partial cross-sectional view of a typical turbine like FIGURE 1 of a modified form employing a freely rotating vaned diffuser;

FIGURE 6 is a partial cross-sectional view of a typical single entry turbine in a modified form; and FIGURE 7 is a partial sectional view of a modified form of freely rotating diffuser structure.

In fluid machines such as conventional radial inflow turbines having radial entrance for gas and radial buckets, secondary vortical flows are created. When the turbine wheel rotates, the incoming gas, which is given a high tangential velocity by nozzles, enters radially into the passage between the buckets. The motion of this gas relative to the stationary elements is a free vortex. The incoming gas, as a vortex, is then turned within the buckets toward the axial direction. This additional turn into the axial direction sets up an even further or secondary vortex due to the difference in tangential bucket velocities between hub and tip. The secondary vortex generates additional energy absorbing circulatory flows within the passages of the rotor creating undesirable frictional losses and non-uniform flow. Also, the secondary vorticity represents energy which cannot be recovered in the form of pressure. The performance of the vaned or vaneless diffusers following the rotor is very sensitive to the uniformity of the flow which is received from such rotor. High efficiency in both rotor and diffuser is obtained by producing and maintaining two-dimensional or radial only flow.

In co-pending application, Ser. No. 243,561 filed Dec.

10, 1962 and assigned to the same assignee as the instant invention, there is disclosed and claimed a compressor design that bypasses the vorticity problem by providing substantially two-dimensional flow in combination with a rotating vaneless diffuser for high pressure ratios at high efficiency.

The present invention is directed to a similar combination of elements to form an efficient high work output turbine. The individual elements per se are known and the improvement in the instant invention lies in the use of a vaned rotating diffuser in combination with substantially two-dimensional flow by particularly designing and locating and combining the turbine buckets and other means serially as will be pointed out. Thus, with the instant invention, very high work output is obtainable by a single row of rotating buckets in addition to other advantages of boundary layer control and sealing as will be apparent as the description proceeds.

Referring first to FIGURE 1, the invention is shown in a typical single entry radial outflow modification. This comprises a rotor disc 10 rotatable around a central axis or shaft 11 which carries the disc. A second disc or hoop 12 is provided concentric with and axially spaced from rotor disc 10 and also spaced radially from shaft 11 to define, with the rotor disc 10, an unobstructed curved inlet gas passage 13 between the discs to direct gas radially outward between the discs. The term "unobstructed" means, as shown, that there is nothing between the fluid entering, such as gas, and the disc surface so that there is radial only entry of fluid into the turbine nozzles and then into the rotating system before any tangential velocity is imparted to the fluid. In order to provide the proper swirl to the incoming gas radial strut supported turbine nozzles 14 are provided at a distance from the center of rotation and radially upstream of the rotor buckets as shown to ensure that they receive only radially flowing gas thus ensuring two-dimensional flow through the passage between the discs and eliminating the undesirable secondary vorticity and consequent losses. Turbine nozzles 14 are preferably given a curature for turning the incoming radial gas in the direction of rotor or disc rotation to give the gas a tangential velocity as seen in FIGURE 2. The nozzles inject high velocity gas into the rotor. High work otuput with high efficiency results. For efficient off-design operation turbine nozzles 14 can be made adjustable by pivoting about axis 15 in any suitable manner not shown.

One of the difficulties of turbines of any type is the presence of boundary layers in the flow passages. The present invention provides a built-in boundary layer control by means of a rotating diffuser in conjunction with the two-dimensional flow through the turbine. The gas is turned through a large angle by means of a single stage of turbine buckets 16 which are highly cambered as shown in FIGURES 2 and 4 and are secured to the discs 10 and 12 so that the discs and buckets rotate as a unit in one direction only and in the opposite direction of camber of the buckets as shown by the arrow in FIGURE 2. It is to be noted that the buckets 16 are particularly located at a radial distance from the center of rotation so that they receive substantially radial flowing gas only so the flow is two-dimentional, thus reducing the losses. Because of the radial two-dimensional flow, buckets 16 are of constant camber untwisted cross-section resulting in inexpensive manufacturing costs. It is to be noted also that buckets 16 are so arranged that their leading edges are constant in the spanwise direction or parallel to the center of rotation. The result is that the rotational speed of any spanwise cross-section is constant. This is desirable because the total pressure relative to the rotor remains constant across the span of the blades and the ability to extract work from the gas flow through the turbine is constant because the rotational speed of any radial point on the bucket is constant. The passage through the buckets may expand, contract or be straight as shown. The high camber (over 30°) of the rotor buckets 16 provides high strength and high work output at moderate rotational speed (less than 1500 feet per second). This provides higher work extraction at a given rotational speed as compared to a conventional turbine.

The turbine described is next serially provided with a rotating diffuser in combination with the two-dimensional flow by extending discs 10 and 12 radially beyond the periphery of buckets 16 to form a rotating preferably slightly expanding vaneless diffuser passage 17. As in any diffusing flow passage, boundary layer fluid becomes a problem and the present invention has a built-in boundary layer control by providing diffuser passage 17 with rotating walls. It can be seen that by rotation of diffuser passage 17, the rotating side walls of the discs 10 and 12 energize the boundary layer due to the centrifugal field on any particle, since all boundary layer particles will have a high tangential velocity approaching or equal to the rotational velocity of the rotor discs. The vaneless rotating diffuser passage 17 which diffuses the flow from a relative number of about 1.5 down to about 1.0 (the absolute velocity through the diffuser being subsonic) is followed by a vaned diffuser 18 radially spaced from the diffuser passage 17 for further diffusion and resulting pressure rise of the gas from the rotor. Of course vanes 18 may be constructed in two rows to perform their function in two steps. As well known, any suitable collecting means such as scroll 19 may be employed to carry the exhaust gas to a discharge by connecting it to the vaned diffuser. Since there is a significant static pressure rise accomplished between the leading edge of the vaned diffuser 18 and the collecting means 19 a boundary layer problem may be encountered. If so, control may be obtained by suitable boundary layer suction or blowing means 20 as shown in the walls of the vaned diffuser or the walls may be porous surfaces, these means of boundary layer control being well known.

As shown in FIGURE 2, off-design operation may require variable turbine nozzles and the outlet or vaned diffuser vanes 18 may also be made variable or adjustable in the same manner. A stationary wall vaneless diffuser may thereby follow vanes 18 before the collector 19 if desired.

With the construction just described, sealing problems are also minimized. The whole rotating structure is surrounded by closely spaced casing 21 and sealing means 22 are provided at a small radius on each disc between the disc and casing well inwardly of the disc outer periphery. This puts the seal at a lower rotational speed of the rotor compared to that of the rotor periphery. Because of the rotation of the gas in the spaces between 12 and 21 and between 10 and 21, the pressure increases outwardly, and the pressure gradient across the seal 22 is lessened. With this construction, no sealing is required at the periphery of the disc between rotating diffuser passage 17 and vaned diffuser 18 because the small sealed volume between casing 21 and the discs, once charged with fluid, is an effective seal itsef for the gas flowing through the turbine.

The radial velocity of the gas is controlled by preferably contacting of the passage through the rotor buckets. The radial velocity of the gas may be decreased through the rotating diffuser if desired as shown in FIGURE 1. Because of the increase in the radial distance, the diffuser portion of the passage may be constant or expanded in width to decrease the radial velocity. The actual expansion depends on the ability of the diffuser portion of the passage to maintain the flow without separation from the disc walls. The boundary layer particles have a high tangential velocity (equal to the rotor speed) that is much greater than the absolute tangential velocity of the gas stream leaving the rotor buckets. A very strong boundary layer control effect is produced on the boundary layer fluid due to centrifugal forces, so the rotating diffuser walls can sustain a high static pressure rise.

The same concept of the two-dimensional radial flow only in combination with the rotating diffuser may be used in a dual entry turbine as shown in FIGURE 3. Similar reference numerals in the one hundred series are applied to similar but not identical parts and, with dual gas entry, it is believed that the arrangement is self-explanatory. Balancing problems are simplified in the dual arrangement and the problem of getting the gasflow through the "eye" of the turbine impeller, that is, the circular opening 23 is reduced. In a single entry turbine this dimension 23 becomes a limiting one. The opening 23 must be of a certain diameter in order to let the gasflow pass into the rotor at a low enough velocity so that losses are small. By using the dual entry, this limitation is greatly alleviated. It provides the rotor buckets at a smaller diameter as well as allowing the location of the rotor discharge at a smaller radius. In very small high speed turbines this can be significant in the overall efficiency of the machine.

FIGURE 4 illustrates partially the nozzle, bucket, and vane layout of the dual entry arrangement showing the outlet guide vanes 18 pivotable as previously described although it is to be understood that this adjustable feature may or may not be used as necessary.

A further modification that might be employed in order to overcome boundary layer problems in vaned diffuser 18 is illustrated in FIGURE 5. As previously explained in connection with FIGURE 1, it may be necessary to provide suction boundary layer control means in vaned diffuser 18 for the reasons given. If suction boundary layer control is used as opposed to boundary layer blowing it will be apparent that the gas removed is from the cycle itself. The result of bleeding gas from the cycle is lost energy. Modification of FIGURE 1 to the structure of FIGURE 5 provides a freely rotatable vaned diffuser 24 that may rotate about the casing 21 in any suitable manner as diagrammatically illustrated. This achieves a boundary layer control without bleeding the gas from the cycle. Again, rotation provides means for energizing the boundary layer in the vaned diffuser by centrifugal force on the boundary layer. Of course, the rotating diffuser 24 might be used to provide shaft power by connecting it to a suitable load.

In the event that the required diffusion is not obtainable in the rotating diffuser passage 17 and vaned diffuser 18 of FIGURES 1 and 3, another feature may be used in combination with the structure herein as shown in FIGURE 6. In this figure, wherein the two hundred series is used to identify similar but not identical parts, as shown, a separate stationary vaneless diffusing chamber 25 is provided between vaned diffuser 218 and vaneless diffuser passage 17. It will be understood that chamber 25 could be rotating as shown in FIGURE 7 if desired. Thus, FIGURES 5 and 7 may be the modified outer end of FIGURES 1 and 3. It is desirable that this chamber 25 have a radial depth of substantially ten percent of the radial distance from the center of rotation of the shaft to the periphery of the discs 10 and 12 in order to provide satisfactory flow characteristics by avoiding excessive friction loss on the walls due to boundary layer build-up. Additionally, rotation, as noted above, reduces the boundary layer problem. It may be desirable to provide more diffusion or pressure rise in the vaneless diffuser and less in the vaned area and this may be accomplished by varying the passage width of the chamber 25 and the vaned diffuser 218 shown of equal width in FIGURE 6. Similarly, it will be understood that vaneless chamber 25 may be used in the freely rotatable diffuser of FIGURE 5 merely by shortening vanes 18 as shown at 218 in FIGURE 7. Thus, the diffusing chamber 25 with vaned diffuser 218 as shown in FIGURE 7 is made freely rotatable like that of FIGURE 5.

It can be seen that the instant invention provides for all the advantages of a two-dimensional fluid flow machine such as a turbine in combination with a rotating diffuser resulting in a simple single stage construction to obtain work output and high efficiencies obtainable heretofore only in multistage axial turbines. Very high work output can be obtained by employing supersonic flow in the turbine nozzles and supersonic flow relative to the turbine buckets rotating at high speed. Both centrifugal pressure rise and the usual aerodynamic pressure rise are present with the rotating diffuser in combination with the two-dimensional flow to recover most of the kinetic energy of the exhaust gases. The sealing and tip leakage problems are reduced and the boundary layer is centrifuged and energized in the rotating diffuser means.

While there have been described preferred forms of the invention, obviously many modifications and variations are possible in light of the above teachings. It is therefore to be understood that within the scope of the appended claims, the invention may be practiced otherwise than as specifically described.

I claim:
1. A radial outflow turbine comprising,
a rotor disc,
a shaft carrying said disc for rotation thereon,
a second disc concentric with and axially spaced from said rotor disc,
said second disc being spaced radially from said shaft and formed to define with said rotor disc an unobstructed curved inlet fluid passage between said discs to direct fluid radially outward between the discs,
stationary turbine nozzles in said fluid passage to receive radially flowing fluid only and impart tangential velocity thereto,
seriate means arranged radially outward including, highly cambered turbine buckets secured to said discs at a radial distance from said shaft so that the buckets receive substantially radial flowing fluid only,
said discs and buckets rotating as a unit opposite to the direction of camber of the buckets,
a casing surrounding said unit,
said discs extending radially beyond the periphery of said buckets to form a rotating vaneless diffuser passage,
a vaned diffuser radially spaced from said diffuser passage, and
collecting means following said vaned diffuser for collecting the fluid therefrom.

2. Apparatus as described in claim 1 wherein said turbine buckets are of constant untwisted cross-section.

3. Apparatus as described in claim 1 wherein said turbine nozzles are adjustable and carried by said casing in said inlet fluid passage inward of said turbine buckets, and seal means on each disc between the disc and casing and disposed radially inward of the periphery of the discs.

4. Apparatus as described in claim 1 wherein the vanes in said vaned diffuser are adjustable.

5. Apparatus as described in claim 1 wherein said vaned diffuser is freely rotatable about said shaft.

6. Apparatus as described in claim 1 wherein a vaneless diffusing chamber is provided between the periphery of the discs and said vaned diffuser,
said chamber having a radial depth of substantially ten percent of the radial distance from the shaft center to the periphery of said discs.

7. Apparatus as described in claim 6 wherein said vaneless diffusing chamber and said vaned diffuser are freely rotatable about said shaft.

8. A radial outflow turbine comprising,
a rotor disc,
a shaft carrying said disc for rotation thereon,
second discs concentric with and axially spaced from said rotor disc one on each side thereof,
said second discs being spaced radially from said shaft and formed to define with said rotor disc on unobstructed curved inlet fluid passage between the rotor disc and each second disc for dual entry of fluid to flow radially outward between the discs, stationary turbine nozzles in each fluid passage to receive radially flowing fluid only and impart tangential velocity thereto, seriate means arranged radially outward including, highly cambered turbine buckets secured to all said discs at a radial distance from said shaft so that the buckets receive substantially radial flowing fluid only, said discs and buckets rotating as a unit opposite to the direction of camber of the buckets, a casing surrounding said unit, said second discs extending radially beyond the periphery of said buckets to form a rotating vaneless diffuser passage, a vaned diffuser radially spaced from said diffuser passage, and collector means following said vaned diffuser for collecting the fluid therefrom.

9. Apparatus as described in claim 8 wherein said turbine buckets are of constant untwisted cross-section.

10. Apparatus as described in claim 8 wherein said turbine nozzles are adjustable and carried by said casing in each inlet fluid passage upstream of said turbine buckets, and seal means on each second disc between the disc and casing and disposed radially inward of the periphery of the discs.

11. Apparatus as described in claim 8 wherein the vanes in said vaned diffuser are adjustable.

12. Apparatus as described in claim 8 wherein said vaned diffuser is freely rotatable about said shaft.

13. Apparatus as described in claim 8 wherein a vaneless diffusing chamber is provided between the periphery of the discs and said vaned diffuser, said chamber having a radial depth of substantially 10% of the radial distance from the shaft center to the periphery of said discs.

14. Apparatus as described in claim 13 wherein said vaneless diffusing chamber and said vaned diffuser are freely rotatable about said shaft.

No references cited.

EVERETTE A. POWELL, JR., *Primary Examiner.*